United States Patent [19]

Levitan

[11] Patent Number: 5,237,628

[45] Date of Patent: Aug. 17, 1993

[54] SYSTEM AND METHOD FOR AUTOMATIC OPTICAL DATA ENTRY

[75] Inventor: Arthur C. Levitan, Wilton, Conn.

[73] Assignee: NYNEX Corporation, New York, N.Y.

[21] Appl. No.: 709,499

[22] Filed: Jun. 3, 1991

[51] Int. Cl.⁵ .......................... G06K 9/20; G06K 9/03
[52] U.S. Cl. ......................................... 382/61; 382/57
[58] Field of Search .......................... 382/61, 57, 40, 1; 235/375, 376, 454, 470

[56] References Cited

U.S. PATENT DOCUMENTS

| | | | |
|---|---|---|---|
| 3,651,459 | 3/1972 | Hahn | 382/40 |
| 3,810,094 | 5/1974 | Mori et al. | 382/61 |
| 3,820,067 | 6/1974 | Shepard | 382/61 |
| 3,832,682 | 8/1974 | Brok et al. | 382/38 |
| 3,855,715 | 12/1974 | Morimoto | 382/61 |
| 4,162,482 | 7/1979 | Su | 382/49 |
| 4,461,029 | 7/1984 | van Bilzem et al. | 382/25 |
| 4,516,262 | 5/1985 | Sakurai | 382/18 |
| 4,821,332 | 4/1989 | Durham | 382/7 |
| 4,910,787 | 3/1990 | Umeda et al. | 382/25 |
| 5,031,223 | 7/1991 | Rosenbaum et al. | 382/1 |
| 5,040,226 | 8/1991 | Elischer et al. | 382/61 |
| 5,119,437 | 6/1992 | Kuwamura et al. | 382/61 |

OTHER PUBLICATIONS

McGraw Hill Encyclopedia of Electronics and Computers, 1984, McGraw Hill Corp., pp. 109-113.
P. Ahmed et al., "Computer Recognition of Totally Unconstrained Handwritten Zip Codes", Int'l Journal of Pattern Recog. and Artificial Intelligence, vol. 1, No. 1 (1987) pp. 1-15.

Primary Examiner—David K. Moore
Assistant Examiner—David Fox
Attorney, Agent, or Firm—Marmorek, Guttman & Rubenstein

[57] ABSTRACT

A system and method for automatically processing machine printed forms which are filled out by hand are disclosed. The inventive system and method eliminate the use of a manual data entry step. Typically each form has one or more fields, each field having a machine printed field identifier such as the words "name" or "social security number" and the corresponding information which is filled in by hand. A scanner or other device forms a digital image of each form. An optical recognition engine searches the digital image of each form through use of an algorithm which can recognize machine printed but not handwritten characters to locate the fields in the digital image by locating the machine printed field identifiers. An offline handwritten character recognition algorithm is then utilized to recognize the handwritten characters in each individual field. Symbolic information corresponding to the recognized handwritten characters is then stored in a database in a memory.

12 Claims, 3 Drawing Sheets

FIG. 1

| COMPANY<br><br>NOTICE OF CLAIM | GA-881000 ACTIVE AND RETIRED EMPLOYEES AND THEIR ELIGIBLE DEPENDENTS | INSURANCE CO<br>PO BOX 0000<br>MAINSTREET<br>ANYTOWN, USA 00000 |
|---|---|---|

PART 1: Complete for all claims.      PATIENT'S SOCIAL SECURITY NO.  ☐ MALE  ☐ FEMALE

| EMPLOYEE'S FULL NAME | ACTIVE  RETIRED | EMPLOYEE'S SOCIAL SECURITY NO. |
|---|---|---|

| EMPLOYEE'S HOME ADDRESS | TELEPHONE NUMBER |
|---|---|

| EMPLOYEE'S COMPANY NAME | EMPLOYEE DATE OF BIRTH |
|---|---|

IS EMPLOYEE  ☐ MARRIED  ☐ SEPARATED
☐ SINGLE  ☐ DIVORCED  ☐ WIDOWED

☐ YES  ☐ NO

| NATURE OF ILLNESS OR INJURY | IF CLAIM IS DUE ACCIDENT STATE WHEN, WHERE AND HOW ACCIDENT OCCURED |
|---|---|

PART 2: Complete if you are married or divorced or separated.

| NAME OF YOUR SPOUSE | IS YOUR SPOUSE EMPLOYED?<br>IS YOUR SPOUSE RECEIVING A PENSION? |
|---|---|
| SPOUSE DATE OF BIRTH | |

PART 3: Complete if for a dependent other than your spouse.

NAME OF DEPENDENT

IS DEPENDENT EMPLOYED?

NAME OF DEPENDENT'S GROUP HEALTH BENEFIT CARRIER

IF CLAIM IS CLASS II RELATIVE, ANSWER THE FOLLOWING:

PART 4: Complete for all claims.

| DATE | ▶ EMPLOYEE'S SIGNATURE |
|---|---|

PART 5: FOR INSURANCE CO. USE ONLY.

SIGNATURE OF INSURANCE EMPLOYEE CERTIFYING BENEFITS

NOTICE OF CLAIM

SYSTEM AND METHOD FOR AUTOMATIC OPTICAL DATA ENTRY

FIELD OF THE INVENTION

The present invention relates to a system and method for electronically processing standard and non-standard machine printed forms which are filled out by hand so as to enter the handwritten information into a database stored in a computer memory for further processing without human intervention.

BACKGROUND OF THE INVENTION

Many organizations have processes which involve massive amounts of paperwork. Such processes include the reimbursement of medical claims by an insurer, the maintaining of employment records, and the approving of expense vouchers.

Generally, this type of process utilizes machine printed information forms which are filled out by hand. While a variety of different forms may be utilized, most machine printed information forms of this type have a number of fields in common which ask a person to fill in, for example, his/her name, address, social security number, etc. Each such field contains a machine printed field identifier (e.g., the words "name", "date", "social security number") and one or more spaces or boxes where a person fills in the requested information by hand.

The information which is written into the forms is then entered into a database which is stored in a computer memory. Typically, information on the forms is read by keypunch operators and mechanically entered into the computer. This method of data entry is costly because it is labor intensive and because there is a relatively large number of data entry errors.

Accordingly, it is an object of the present invention to provide a method and system for processing large numbers of machine printed forms to automatically enter handwritten information into a computer database and to eliminate the manual data entry step.

SUMMARY OF THE INVENTION

In accordance with the present invention, a digital image of each printed form to be processed is generated. The digital image is then transmitted to an optical recognition engine. The digital image may be generated by a scanner which is attached to the optical recognition engine or may be generated by a fax machine located remotely from the optical recognition engine and transmitted to a fax interpreter board associated with the optical recognition engine. The optical recognition engine itself may be implemented using a general purpose computer or special purpose hardware processing elements.

The purpose of the optical recognition engine is to convert the digital image of each form into symbolic information about what symbols have been handwritten onto the form.

The optical recognition engine itself comprises two optical recognizers. The first optical recognizer executes an optical character recognition algorithm which can recognize only machine printed characters and which cannot recognize handwritten characters. Many machine printed character recognition algorithms are known and most are based on a pattern recognition or template matching process. The first optical recognizer searches the digitized image of each form for certain predetermined machine printed field identifiers such as "social security number", "birthdate", etc. in order to locate the corresponding fields in the digital image of the form. These field identifiers are chosen because they are common to a significant number of different machine printed forms so that the system and method of the present invention have the capability of processing a variety of different forms.

The second optical recognizer applies an offline handwritten character recognition algorithm to the fields located by the first optical recognizer to convert the digital image of the handwritten information contained in these fields into symbolic form. In particular, the handwritten character recognition algorithm goes through the steps of finding, segmenting, and recognizing (i.e. understanding) the handwritten information in order to convert the handwritten information into symbolic form. The symbolic information is then stored in a memory as part of a database.

The inventive method and system is used to process a variety of machine printed forms to electronically store handwritten information in a highly efficient manner. The machine printed character recognition algorithm is relatively simple and utilizes a relatively small amount of processing power. This type of algorithm can locate certain fields in a digital image of a form by locating machine printed field identifiers with close to 100° accuracy. The offline handwritten character recognition algorithm, which utilizes greater processing resources, is only utilized to process the relatively small field regions to locate and recognize the handwritten information contained therein.

BRIEF DESCRIPTION OF THE DRAWINGS

FIG. 1 illustrates a machine printed form which contains fields that are filled with handwritten information.

DETAILED DESCRIPTION OF THE INVENTION

FIG. 1 illustrates a machine printed form which is used to make a medical insurance claim. The form of FIG. 1 comprises a plurality of fields 2,3, each of which comprises a machine printed field identifier 4,5 and a space 6,7 to be filled in by hand with the information indicated by the field identifier. For example, the field designated by the numeral 2, contains the machine printed identifier "employee's social security number". Because a large number of forms have fields in common (e.g. name, social security number, etc.) the method and system of the present invention may be utilized to process a variety of different forms.

Figure 2:
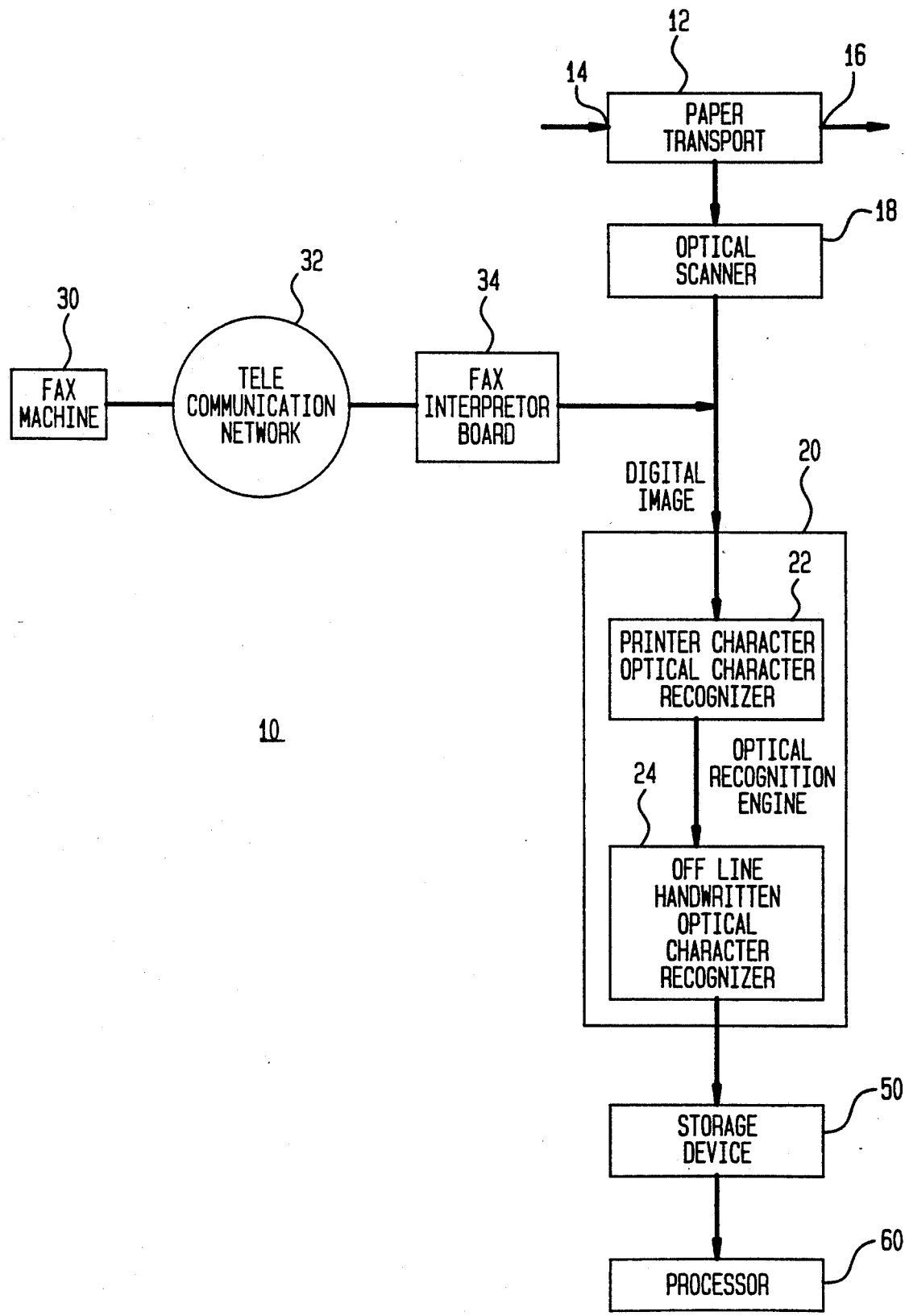
FIG. 2 illustrates a system for automatically entering the handwritten information in the form of FIG. 1 into a database stored in a memory.

Typically, an organization such as a large corporate employer or an insurance company has to process a large number of forms of the general type shown in FIG. 1. Such processing comprises entering the handwritten information contained in the various fields into a database stored in a computer memory. FIG 2 illustrates a system 10 for carrying out such processing without the use of manual data entry.

The system 10 of FIG. 2 comprises a paper transport system 12. The forms to be processed are inputted into the paper transport system 12 at the input 14 and leave the paper transport system at the output 16. The paper transport system 12 moves the forms to be processed past the optical scanner system 18.

The scanner system 18 forms a digital image of a form by illuminating the form with a bright light such as a laser light and then recording the reflected light using storage devices such as CCD's. This type of scanner may be utilized to form a bitonal digital image wherein each pixel is either white or black corresponding to logic "1" or logic "0".

After the digital image of a form is generated by the scanning system 18, the digital image is transmitted to an optical recognition engine 20. The optical recognition engine 20 may be implemented utilizing a general purpose computer or may be implemented using special dedicated hardware processing elements. The hardware elements may be optical processing elements or electronic processing elements such as resistor summing networks and digital logic circuits.

In the system 10 of FIG. 2, the digital image may be generated by the scanner system 18 as described above. Alternatively, the digital image may be generated by a fax machine 30 located remotely from the optical recognition engine 20. In this case, the signals outputted by the fax machine 30 are transmitted via a communications network 32 to a fax interpreter board 34 associated with the recognition engine 20. The fax interpreter board 34, which is available commercially, then outputs the digital image to the recognition engine 20.

The purpose of the recognition engine 20 is to convert the digital image of the handwritten information filled into each form into corresponding symbolic information. The optical recognition engine 20 comprises two optical recognizers 22 and 24. The first optical recognizer 22 can recognize machine printed characters but not handwritten characters. Numerous optical recognizers for recognizing machine printed characters are known (see e.g., McGraw Hill Encyclopedia of Electronics and Computers, 1984 McGraw Hill Book Corp., pp 109-111. Optical recognizers for recognizing machine printed characters generally execute a template matching algorithm to recognize particular characters. Alternatively, the machine printed character optical recognizer 22 may recognize printed characters by extracting distinctive features and using them in a deci7 sion logic to identify the characters.

The machine printed character optical recognizer 22 searches the digital image of each form and identifies the location in the form of certain machine printed field identifiers which are common to a variety of different forms (e.g., name, social security number, etc.).

Once the locations of the fields are determined by the machine printed character optical recognizer 22, the optical recognizer 24 is used to identify handwritten characters within these fields. The optical recognizer 24 is an offline handwritten character optical recognizer. An example of such an optical recognizer is disclosed in "Computer Recognition of Totally Unconstrained Handwritten Zip Codes", P. Ahmed et al, Int'l Journal of Pattern Recognition and Artificial Intel., Vol. 1, No. 1 (1987), pp.1-15, World Sci Pub. Co.)

As shown in FIG. 2, the symbolic information outputted by the optical recognizer 24 is then stored in a storage device 50 which may be a magnetic disk or other memory. The symbolic information stored in the storage device 50 may then be further processed using the processor 60. The processor 60 may be implemented using the same general purpose computer as is utilized to implement the optical recognition engine or using a separate computer system.

Figure 3:
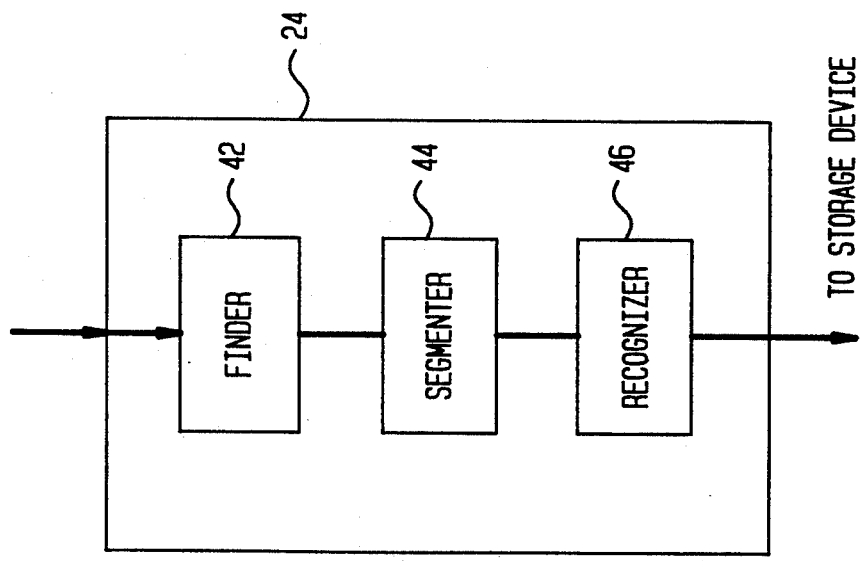
FIG. 3 illustrates an optical recognizer utilized in the system of FIG. 2.

An offline handwritten character optical recognizer 24 is illustrated in greater detail in FIG. 3. As shown in FIG. 3, an offline handwritten optical character recognizer 24 comprises a finder 42 which locates the handwritten material within a field of the digital image (the field itself having already been located by the optical recognizer 22). Once the handwritten material is located in a particular field of a digital image, a segmenter 44, segments the handwritten material by identifying the boundaries between characters. The recognizer 46 then recognizes the individual characters by outputting corresponding symbolic information.

Figure 4:
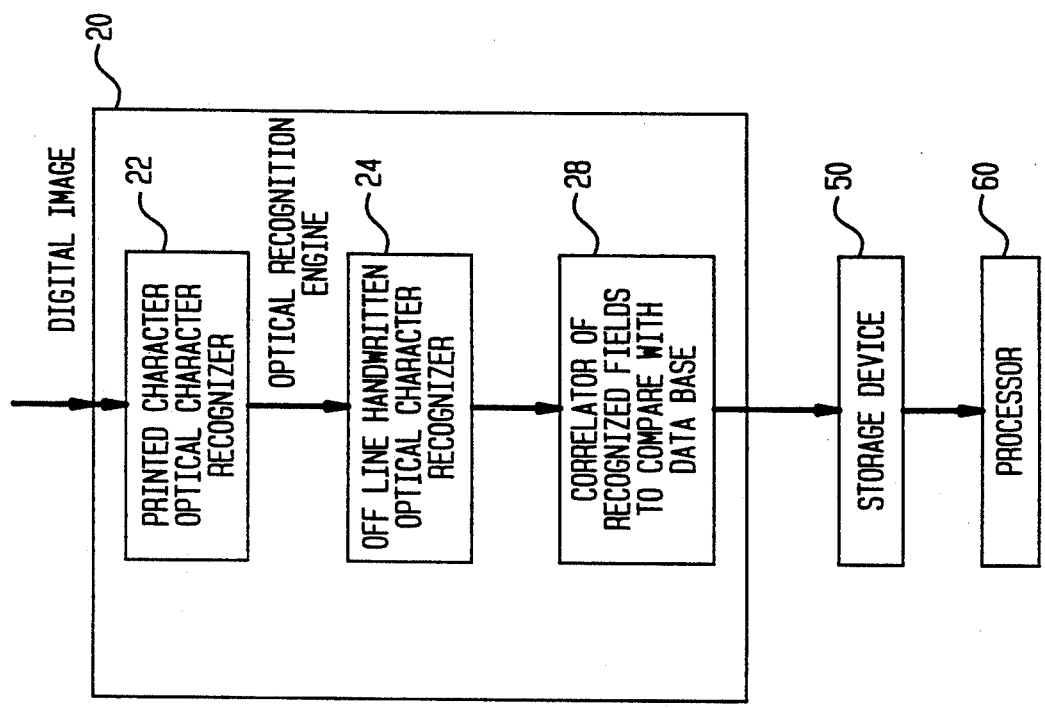
FIG. 4 illustrates an alternative optical recognizer for use in the system of FIG. 2.

An alternative optical recognition engine 20' is illustrated in FIG. 4. Like the optical recognition engine 20 of FIG. 2, the recognition engine 20' of FIG. 4 comprises the machine printed character optical recognizer 22 and the offline handwritten character optical recognizer 24. However, in some cases the optical recognizer 24 cannot recognize all of the handwritten characters. If some handwritten characters in a form cannot be recognized by the optical recognizer 24, the correlator 28 can be utilized to compare the handwritten characters which are recognized with a database to enhance the recognition probability of the unrecognized handwritten characters. For example, suppose that the handwritten character optical recognizer 24 recognizes numbers but not letters in a particular form. In this case, a handwritten social security number can be recognized and the correlator 28 can be utilized to compare the recognized social security number to a database to enhance the recognition probability of handwritten information composed of letters such as a person's name.

In short, there has been disclosed herein a system and method for processing large numbers of machine printed forms to extract handwritten information from the forms and to store this handwritten information in a memory. The system and method of the present invention utilize optical character recognition and eliminate manual data entry. It is a significant advantage that the inventive system and method can be utilized to process a variety of different types of machine printed information forms. This advantage arises because these forms generally have a number of fields in common. The inventive system and method is very efficient because a relatively simple machine printed optical character recognition algorithm is utilized to locate the fields within a digital image of each form and a more complex offline handwritten character recognition algorithm is utilized only to identify characters within the already located fields. Thus, great efficiency is achieved in the use of processing resources.

Finally, the above-described embodiments of the invention are intended to be illustrative only. Numerous alternative embodiments may be devised by those skilled in the art without departing from the spirit and scope of the following claims.

I claim:

1. An electronic data processing system for processing large numbers of machine printed forms containing one or more fields, each field having a machine printed human intelligible field identifier which describes to a person information to be written into the field, and one or more handwritten characters written in response to the corresponding machine printed field identifier, said electronic data processing system comprising:

generating means for generating a digital image of each of said forms, and an optical recognition engine comprising a first optical recognizer capable of recognizing machine printed characters but not handwritten characters for searching the digital image of each form to identify the locations of a selected one or more of said fields by recognizing only said human intelligible machine printed field identifiers, and a second optical recognizer capable of recognizing handwritten characters for recognizing the handwritten characters in the fields located by said first optical recognizer in said digital image of each form, wherein said optical recognition engine uses only the same human intelligible field identifiers, which describe to a person information to be written into corresponding fields, for locating said fields containing handwritten characters without using any additional machine printed field identifiers.

2. The system of claim 1 wherein said generating means comprises a scanner.

3. The system of claim 1 wherein said generating means comprises a fax machine located remotely from said optical recognition engine.

4. The system of claim 1 wherein said optical recognition engine is formed by a general purpose computer.

5. The system of claim 1 wherein said second optical recognizer comprises a finder for locating handwritten material in said fields, a segmenter for identifying the location of character boundaries in said handwritten material, and a recognizer for recognizing individual handwritten characters.

6. A method for processing large numbers of machine printed forms containing one or more fields, each field having a machine printed human intelligible field identifier which describes to humans information to be written into the field and one or more handwritten characters written in response to the corresponding field identifier, said method comprising the steps of:

electroncially generating a digital image of each of said forms to be processed, utilizing an optical recognition engine to execute an optical character recognition algorithm which recognizes machine printed characters but not handwritten characters, searching the digital image of each of said forms to locate said fields by recognizing said human intelligible machine printed field identifiers, utilizing said optical recognition engine to execute a handwritten character recognition algorithm for recognizing handwritten characters contained in said located fields, and for outputting symbolic information representative of said recognized handwritten characters, and storing said symbolic information in a memory, wherein said optical recognition engine uses only the same human intelligible machine printed field identifiers, which describe to a person information to be written into corresponding fields, for locating said fields containing handwritten characters, without using any additional machine printed field identifiers.

7. The method of claim 6 wherein said optical recognition engine is formed by a general purpose computer.

8. The method of claim 6 wherein said algorithm which can recognize machine printed but not handwritten characters is a template matching algorithm.

9. The method of claim 6 wherein said offline handwritten character recognition algorithm comprises the steps of finding handwritten material in said fields, segmenting the handwritten material by locating character boundaries, and recognizing individual characters.

10. The method of claim 6 wherein said handwritten character recognition algorithm can recognize only a subset of said handwritten characters and wherein said method comprises the step of comparing said recognized handwritten characters with a database to determine the unrecognized handwritten characters.

11. The method of claim 10 wherein said subset of handwritten character comprises numbers.

12. An electronic data processing system for processing machine printed forms containing one or more fields, each field having a machine printed human intelligible field identifier which describes to a person information to be written into the field, and one or more handwritten characters written in response to the corresponding machine printed field identifier, said electronic data processing system comprising:

digitizing means for generating a digital image of each of said forms, first optical recognition means which can recognize machine printed but not handwritten characters for searching the digital image of each form to find the location of selected ones of said fields by recognizing said machine printed human intelligible field identifiers, and second optical recognition means which can recognize handwritten characters for recognizing the handwritten characters contained in the fields located by the first optical recognition means, wherein said first optical recognition means uses only the same human intelligible field identifiers, which describe to a person information to be written into corresponding fields, for locating said fields containing handwritten characters without using any additional machine printed field identifiers.

* * * * *